United States Patent
Kao et al.

Patent Number: 5,949,909
Date of Patent: Sep. 7, 1999

[54] APPARATUS FOR DECOMPRESSING MULTIPLE CODES IN A SINGLE CLOCK CYCLE

[75] Inventors: Jean-Swey Kao, Cupertino; Ruben Medrano, Montebello; Ramond Rodriguez, West Covina, all of Calif.

[73] Assignee: Xerox Corporation, Stamford, Conn.

[21] Appl. No.: 08/910,437

[22] Filed: Aug. 13, 1997

Related U.S. Application Data

[63] Continuation-in-part of application No. 08/502,838, Jul. 11, 1995, abandoned.

[51] Int. Cl.[6] .............................. G06K 9/36; G06K 9/46
[52] U.S. Cl. ........................................... 382/233; 382/234
[58] Field of Search ..................................... 382/232–234; 341/51, 63, 67, 97, 107; 348/390, 400; 358/426–427, 261.1–261.4; 364/715.02; 395/706, 114

[56] References Cited

U.S. PATENT DOCUMENTS

| | | | |
|---|---|---|---|
| 5,206,734 | 4/1993 | Kao | 358/261.3 |
| 5,229,863 | 7/1993 | Kao et al. | 358/261.3 |
| 5,757,966 | 5/1998 | Kao et al. | 382/234 |
| 5,764,801 | 6/1998 | Munemasa et al. | 382/234 |

*Primary Examiner*—Leo H. Boudreau
*Assistant Examiner*—Bhavesh Mehta
*Attorney, Agent, or Firm*—Fariba Rad

[57] ABSTRACT

A decompressor for generally providing more than four bits of decompressed data. The decompressor of this invention is capable of decoding four non-long horizontal codes in parallel and selecting either the decompressed data of the first code if it generates four or more bits of decompressed data or selecting the decompressed data of the first code with a combination of the decompressed data of the following codes if the first code generates less than four bits of decompressed data. This decompressor decompresses the long horizontal codes (codes which generate more than four bits of data) separately.

12 Claims, 12 Drawing Sheets

FIG. 2

| Notation | Code | Code Length |
|---|---|---|
| PASS | 0001 | 4 |
| V0 | 1 | 1 |
| VL1 | 010 | 3 |
| VL2 | 000010 | 6 |
| VL3 | 0000010 | 7 |
| VR1 | 011 | 3 |
| VR2 | 000011 | 6 |
| VR3 | 0000011 | 7 |
| H(1W | 001000111 | 9 |
| H(2W | 0010111 | 7 |
| H(3W | 0011000 | 7 |
| H(4W | 0011011 | 7 |
| H(1B | 001010 | 6 |
| H(2B | 00111 | 5 |
| H(3B | 00110 | 5 |
| H(4B | 001011 | 6 |
| 1W) | 000111 | 6 |
| 2W) | 0111 | 4 |
| 3W) | 1000 | 4 |
| 4W) | 1011 | 4 |
| 1B) | 010 | 3 |
| 2B) | 11 | 2 |
| 3B) | 10 | 2 |
| 4B) | 011 | 3 |

| | DecoderA | DecoderB₁ | DecoderB₂ | DecoderB₃ | DecoderC₁ | DecoderC₂ | DecoderD | Pidata | Pdelta |
|---|---|---|---|---|---|---|---|---|---|
| 1 | 1 | 1 | | | | | 1 + | 1010 | deltaD |
| 2 | 1 | 1 | | | | | 2P + | 1011 | deltaD |
| 3 | 1 | 1 | | | 2 + | | | 1001 | deltaC₁ |
| 4 | 1 | 1 | | | 2P + | | | 1000 | deltaC₁ |
| 5 | 1 | 2 | | | | 1 + | | 1101 | deltaC₂ |
| 6 | 1 | 2 | | | | 2P + | | 1100 | deltaC₂ |
| 7 | 1 | 2P | | | | | 1 + | 1110 | deltaD |
| 8 | 1 | 2P | | | | | 2P + | 1111 | deltaD |
| 9 | 1 | 3 + | | | | | | 1110 | deltaB₁ |
| 10 | 1 | 3P + | | | | | | 1111 | deltaB₁ |
| 11 | 2 | | 1 | | | 1 + | | 0101 | deltaC₂ |
| 12 | 2 | | 1 | | | 2P + | | 0100 | deltaC₂ |
| 13 | 2 | | 2 + | | | | | 0110 | deltaB₂ |
| 14 | 2 | | 2P + | | | | | 0111 | deltaB₂ |
| 15 | 2P | | | | | | 1 + | 0010 | deltaD |
| 16 | 2P | | | | | | 2P + | 0011 | deltaD |
| 17 | 2P | | | | 2 + | | | 0001 | deltaC₁ |
| 18 | 2P | | | | 2P + | | | 0000 | deltaC₁ |
| 19 | 3 | | | 1 + | | | | 0010 | deltaB₃ |
| 20 | 3 | | | 2P + | | | | 0011 | deltaB₃ |
| 21 | 3P | | | | | 1 + | | 0001 | deltaC₂ |
| 22 | 3P | | | | | 2P + | | 0000 | deltaC₂ |
| 23 | 4 + | | | | | | | 0001 | deltaA |
| 24 | 4P + | | | | | | | 0000 | deltaA |

| | $a_0$ | $P_0$ | $P_1,P_2,P_3$ | $A_0B_1$ | $A_0B_2$ | $A_0B_3$ |
|---|---|---|---|---|---|---|
| 1st { | 0 | 0 | 000 | 3+ | 3+ | 3+ |
| | 0 | 0 | 001 | 3 | 3+ | 3+ |
| | 0 | 0 | 010 | 2 | 3 | 3+ |
| | 0 | 0 | 011 | 2 | 3+ | 3+ |
| | 0 | 0 | 100 | 1 | 2 | 3+ |
| | 0 | 0 | 101 | 1 | 2 | 3 |
| | 0 | 0 | 110 | 1 | 3 | 3+ |
| | 0 | 0 | 111 | 1 | 3+ | 3+ |
| | 0 | 1 | 000 | 3+ | 3+ | 3+ |
| | 0 | 1 | 001 | 3 | 3+ | 3+ |
| | 0 | 1 | 010 | 2 | 3 | 3+ |
| | 0 | 1 | 011 | 2 | 3+ | 3+ |
| | 0 | 1 | 100 | 3+ | 3+ | 3+ |
| | 0 | 1 | 101 | 3 | 3+ | 3+ |
| | 0 | 1 | 110 | 3+ | 3+ | 3+ |
| | 0 | 1 | 111 | 3+ | 3+ | 3+ |
| 2nd { | 1 | 0 | 000 | 3+ | 3+ | 3+ |
| | 1 | 0 | 001 | 3+ | 3+ | 3+ |
| | 1 | 0 | 010 | 3 | 3+ | 3+ |
| | 1 | 0 | 011 | 3+ | 3+ | 3+ |
| | 1 | 0 | 100 | 2 | 3+ | 3+ |
| | 1 | 0 | 101 | 2 | 3 | 3+ |
| | 1 | 0 | 110 | 3 | 3+ | 3+ |
| | 1 | 0 | 111 | 3+ | 3+ | 3+ |
| | 1 | 1 | 000 | 1 | 3+ | 3+ |
| | 1 | 1 | 001 | 1 | 3 | 3+ |
| | 1 | 1 | 010 | 1 | 2 | 3 |
| | 1 | 1 | 011 | 1 | 2 | 3+ |
| | 1 | 1 | 100 | 2 | 3+ | 3+ |
| | 1 | 1 | 101 | 2 | 3 | 3+ |
| | 1 | 1 | 110 | 3 | 3+ | 3+ |
| | 1 | 1 | 111 | 3+ | 3+ | 3+ |

FIG. 16

7-BITS
B₁C B₂C

| 0 | 0 | 1 | 1 | 0 | 1 | 1 | 0 | 1 |
|---|---|---|---|---|---|---|---|---|
| 0 | 0 | (1) | X | X |   |   |   |   |

6-BITS
B₁C B₂C

| 0 | 0 | 1 | 1 | 0 | 1 | 1 | 0 | 1 |
|---|---|---|---|---|---|---|---|---|
| 0 | 0 | 0 | (1) | X |   |   |   |   |

7-BITS

| 0 | 0 | 1 | 1 | 0 | 1 | 1 | 0 | 1 |
|---|---|---|---|---|---|---|---|---|
| 0 | 1 | (0) | X | X |   |   |   |   |

6-BITS
B₁ B₂

| 0 | 0 | 1 | 1 | 0 | 1 | 1 | 0 | 1 |
|---|---|---|---|---|---|---|---|---|
| 0 | 0 | 1 | (0) | X |   |   |   |   |

A₃

| LHdelta | Lidata | | Decompressed Data | | Repeat |
|---|---|---|---|---|---|
| | bit₁ | bit₀ | | | |
| 8 and more on the following clock cycle | 0 | 0 | 0-000000-0 | } white | 6 |
| | 1 | 1 | 1-111111-1 | } black | |
| less than 8 ex: 5 | 0 | 1 | 0-000-1 | } white | 3 |
| | 1 | 0 | 1-111-0 | } black | |
| exactly 8 no more count on the following clock cycle | 0 | 1 | 0-000000-1 | } white | 6 |
| | 1 | 0 | 1-111111-0 | } black | |

FIG. 20

APPARATUS FOR DECOMPRESSING MULTIPLE CODES IN A SINGLE CLOCK CYCLE

This application is a continuation-in-part of U.S. patent application Ser. No. 08/502,838, filed Jul. 11, 1995, now abandoned.

BACKGROUND OF INVENTION

This application relates to U.S. application Ser. No. 08/910,438, "High-Speed Decompressor" Attorney Docket No. D/95273QI (Common Assignee) Filed concurrently herewith., which is a continuation-in-part of U.S. patent application Ser. No. 08/502,841, filed Jul. 11, 1995, now abandoned.

This invention relates generally to retrieval of an electronically compressed document and more particularly concerns a decompressor in which a decompressor is used for decoding CCITT, IBMMR and TIFF codes and supplying generally at least four bits of decompressed data to a high speed printing engine at each clock cycle.

With a growing need for faster printing engines, the need for faster decompressors is also growing. A fast printing engine needs a decompressor to provide a flow of decompressed data with a speed which matches the consumption rate of decompressed data by the printing engine. If the decompressor is slower than the print engine, then a gap will be shown on the printed document.

Usually, the codes, which represent the frequent color changes on the document, slow down the decompressor. Among all the codes of CCITT two-dimensional compression algorithm, IBMMR and TIFF codes some codes can potentially generate only one bit data. A sequence of these codes will result in worst case performance, which is the most frequent change of color. This effect slows down the flow of data to the printing engine.

There are decompressors which can generate two bits of decompressed data every clock cycle. However, there is still a need to further increase the speed of the decompressors.

It is an object of this invention to increase the speed of decompressing the CCITT, IBMMR and TIFF codes by generally providing four bits of decompressed data at each clock cycle. Hereinafter, for the purpose of simplicity only the CCITT codes are discussed. However, it should be noted that the disclosed embodiment of this invention can be utilized to decompress CCITT codes as well as IBMMR and TIFF codes.

SUMMARY OF THE INVENTION

In accordance with the present invention, a decompressor is disclosed which is capable of decompressing codes and sending out in most cases four bits or more decompressed data.

The decompressor of this invention includes means for receiving a series of a given number of at least three codes in one clock cycle and identifying them as long horizontal codes or non-long horizontal codes, the given number of at least three codes equaling a desired given minimum number of bits of decompressed data to be generated during one clock cycle.

The non-long horizontal codes will be decoded by a parallel decoder which is capable of decoding in parallel four non-long horizontal codes and the long horizontal codes will be decoded by a long code decoder. After decoding the codes, a selecting means selects the decompressed data of the first code if the first code of non-long horizontal codes has generated four bits or more decompressed data, selects a combination of the first code with the following codes of the non-long horizontal codes if the first code has generated less four bits of data or selects the decompressed data of the long horizontal code.

BRIEF DESCRIPTION OF THE DRAWINGS

FIG. 2 shows code patterns and their code lengths;

FIG. 11 shows a table of all the possible conditions between the four codes

FIG. 12 shows a simplified table which shows different possibilities of four bits from the previous line with respect to the starting position;

FIG. 16 shows the starting position of encoder B2 with respect to the data from the previous line;

FIG. 17 shows the starting position of encoder B3 and encoder D with respect to the data from the previous line;

FIG. 18 shows the starting position of encoder C1 with respect to the data from the previous line;

FIG. 19 shows the starting position of encoder C2 with respect to the data from the previous line; and FIG. 20 shows the intermediate data and the expanded data (uncompressed data) for different counts of a long horizontal code.

DESCRIPTION OF THE PREFERRED EMBODIMENT

Figure 1:
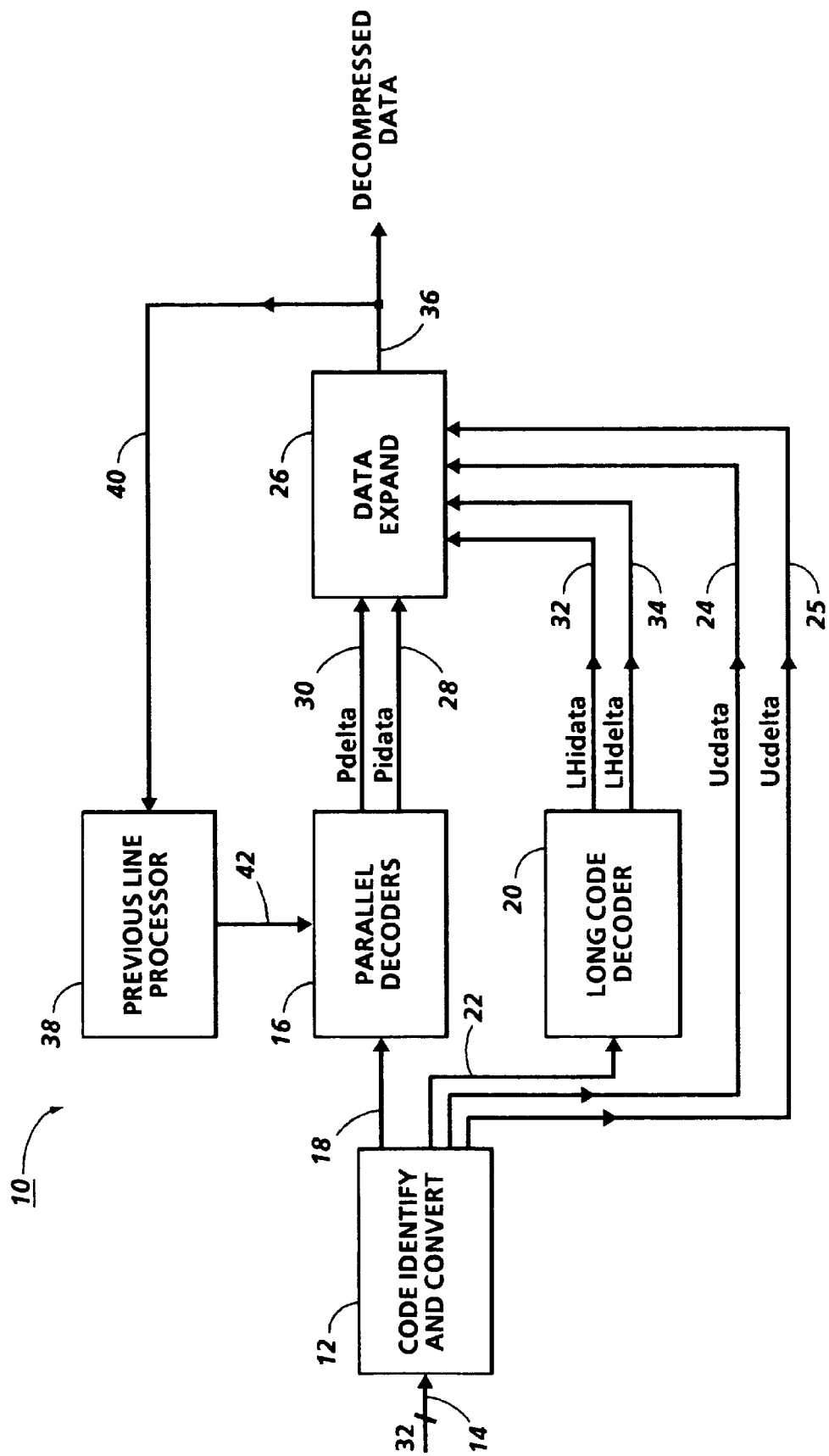
FIG. 1 shows a block diagram of the present invention.

FIG. 1 is a block diagram of the present invention. In the decompressor 10 of this invention, code identify and convert block 12 receives variable length codes (compressed image data) from a processor interface over a 32 bit bus 14. The code identify and convert 12 receives 32 bits of data via line 14 at each clock cycle and in the same clock cycle identifies a series of four codes and converts them into four fixed length intermediate codes. The code identify and convert block 12 also separates long horizontal codes from the non-long horizontal codes. A long horizontal code is defined as a horizontal code which generates more than four bits of decompressed data. Non-long horizontal codes, which are called PVSH codes, include pass codes, vertical codes and short horizontal codes. A short horizontal code is a code which generates four or less bits of decompressed data.

The code identify and convert block 12 sends the series of PVSH intermediate codes to parallel decoders 16 via line 18. However, if there is a long horizontal code, the code identify and convert block 12 sends the PVSH codes prior to the long horizontal code to the parallel decoders 16 and via line 18 and holds the long horizontal code and its following codes until the next clock cycle. On the next clock cycle, code identify and convert block 12 sends an intermediate code to the parallel decoders 16 and sends out a LHcount (long horizontal count) to the long code decoder 20 via line 22.

In the same clock cycle, either the parallel decoder 16 or the long code decoder 20 generates intermediate data and a count for the number of bits of the decompressed data. The intermediate data from the parallel decoder 16 is called Pidata (PVSH intermediate data) and the count for the decompressed data from the parallel decoders 16 is called Pdelta (PVSH delta). The Pidata and the Pdelta are sent from the parallel decoders 16 to the data expand block 26 via lines 28 and 30 respectively. The intermediate data from the long code decoder 20 is called LHidata (long horizontal intermediate data) and the count for the decompressed data from the long code decoder 20 is called LHdelta (long horizontal delta).

The LHidata and the LHdelta are sent from the long code decoder 20 to the data expand block 26 via lines 32 and 34 respectively. In the same clock cycle, the data expand block 26 will expand the intermediate data from either the parallel decoders 16 or the long code decoder 20 to generate decompressed data 36. The data expand block 26 will concatenate the decompressed data from each clock cycle with the decompressed data of the previous clock cycles and will store the result until there are 32 bits of decompressed data available in which case the data expand block 26 will send out 32 bits of decompressed data. The decompressed data will be sent to previous line processor 38 via line 40. The previous line processor 38 will provide the necessary data from the previous line to the parallel decoders 16 via line 42 for decompressing the PVSH codes. The previous line processor holds all the bits of one scan line.

The code identify and convert block 12 also sends out an incoming uncompressed data and its count to data expand block 26 via lines 24 and 25 respectively. In some encoding systems, if the encoded data becomes larger than the raw data, the code will be ignored and the raw data will be sent out as uncompressed data. Therefore, the decompressor has to recognize the uncompressed data and receive the uncompressed data and send it out unaltered. The expand block 26 receives the uncompressed data and sends it out unaltered.

In the code identify and convert block 12 the challenge is to recognize four codes whose code length may vary from one bit to nine bits. Referring to FIG. 2, there are shown code patterns and their code lengths. For example, the length of the code for VR3 is 7 bits, the length of H(1W is 9 bits or the length of pass code is 4 bits. However, as it can be observed, the length of the codes are not more than 9 bits. It should be noted that in the code notation, "("represents the leading horizontal code and ")" represents the terminating horizontal code.

If four codes are to be identified in parallel, the possible combinations of four codes are over four thousand cases. This parallel approach results in a very large and complicated design. Another approach is to identify four codes in sequence. In this approach, after one code is identified and shifted, the second code will be identified and shifted, then the third code will be identified and shifted and finally the fourth code will be identified. This sequential approach results in a long timing delay through the sequential identifying and shifting.

In this invention a middle ground approach is taken. In this approach two codes are simultaneously identified, data will be shifted and then the next two codes are simultaneously identified. Identifying all four codes are performed in one clock cycle. The first and second codes are identified in parallel and they are both shifted so that the shifted data can be searched for the third and fourth codes in parallel. Since only two codes are needed to be identified in parallel, the complexity is greatly reduced. In this approach, there is only one shift compared to three shifts of the sequential approach. Therefore, with the approach of this invention, the timing is greatly improved.

Figure 3:
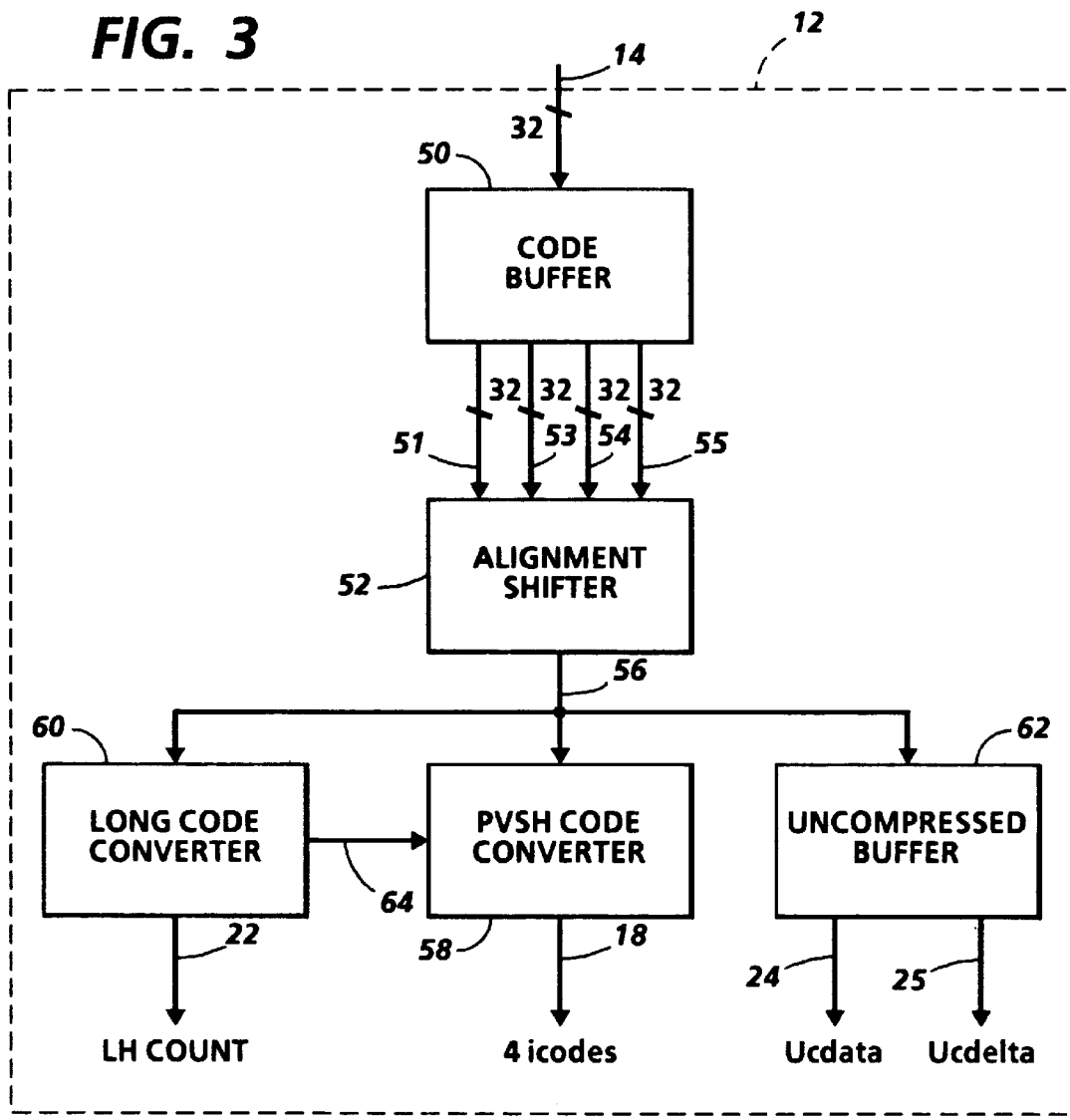
FIG. 3 shows a detailed block diagram of the code identify and convert block.

Referring to FIG. 3, there is shown a detailed block diagram of the code identify and convert block 12. The code buffer 50 receives 32 bits of data at each clock cycle via line 14. The received data will be stored in a 32-bit wide and 4-bit deep code buffer 50. At each clock cycle, the code buffer 50 sends out four 32 bits of data to alignment shifter block 52 via lines 51, 53, 54 and 55. Alignment shifter block 52 receives the data and sends out 30 bits of data via line 56 to PVSH code converter 58, long code converter 60 and uncompressed buffer 62. The alignment shifter 52 is 71-bit wide and 4-bit deep. The alignment shifter block 52 sends out the first 30 bits without shifting. The reason for sending out 30 bits of data is that the maximum possible number of bits of four codes is 30 bits. For example, there might be three codes with 7 bits and a code with 9 bits in which the total number of bits will be 30 bits. Therefore, depending on the number of bits on each code, four codes may have less than 30 bits.

Figure 4:
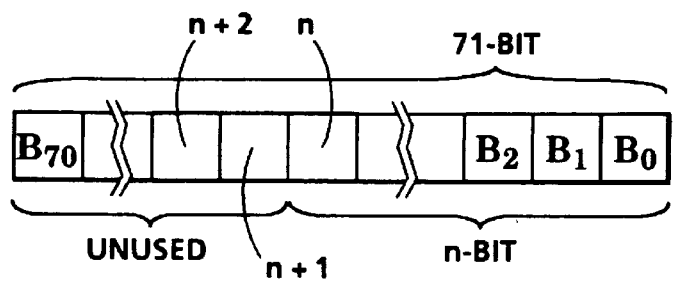
FIG. 4 shows one row of the alignment shifter.

Since at each clock cycle, the four consecutive codes under decompression can have 30 bits or less, the alignment and shifter block 52 has to keep track of unused bits and shift the unused bits to align them with the incoming data. Referring to FIG. 4, there is shown one row of the alignment shifter 52. Each register in the alignment shifter 52 has 71 bits $B_0$–$B_{70}$. At each cycle, if n-bits are used, then the alignment and shifter block 52 shifts the n+1 bit into $B_0$ and all the unused bits after n+1 into the bits following $B_0$. Depending on the number of bits used at each clock cycle, the alignment and shifter block 52 takes in a new set of bits from the code buffer 50. The number of bits in the new set of bits is equal to the number of bits which were used in the previous clock cycle. Since lines 51, 53, 54 and 55 each is a 32 bit bus therefore, at each clock cycle, the alignment and shifter block 52 takes in the new set of bits either from one bus or from two consecutive bus in which one carries the following 32 bits of the other bus.

Referring back to FIG. 3, the PVSH code converter 58 converts the PVSH codes into fixed length PVSH intermediate codes and sends them to the parallel decoders 16 (FIG. 1) via line 18. The long code converter 60 generates a LHcount for a long horizontal code and sends it to the long code decoder 20 via line 22 while sending a signal to the PVSH code converter via line 64 to inform the PVSH code converter that there is a long horizontal code and therefore, the PVSH code converter should send an ignore intermediate code to the parallel decoders 16 (FIG. 1).

Figure 5:
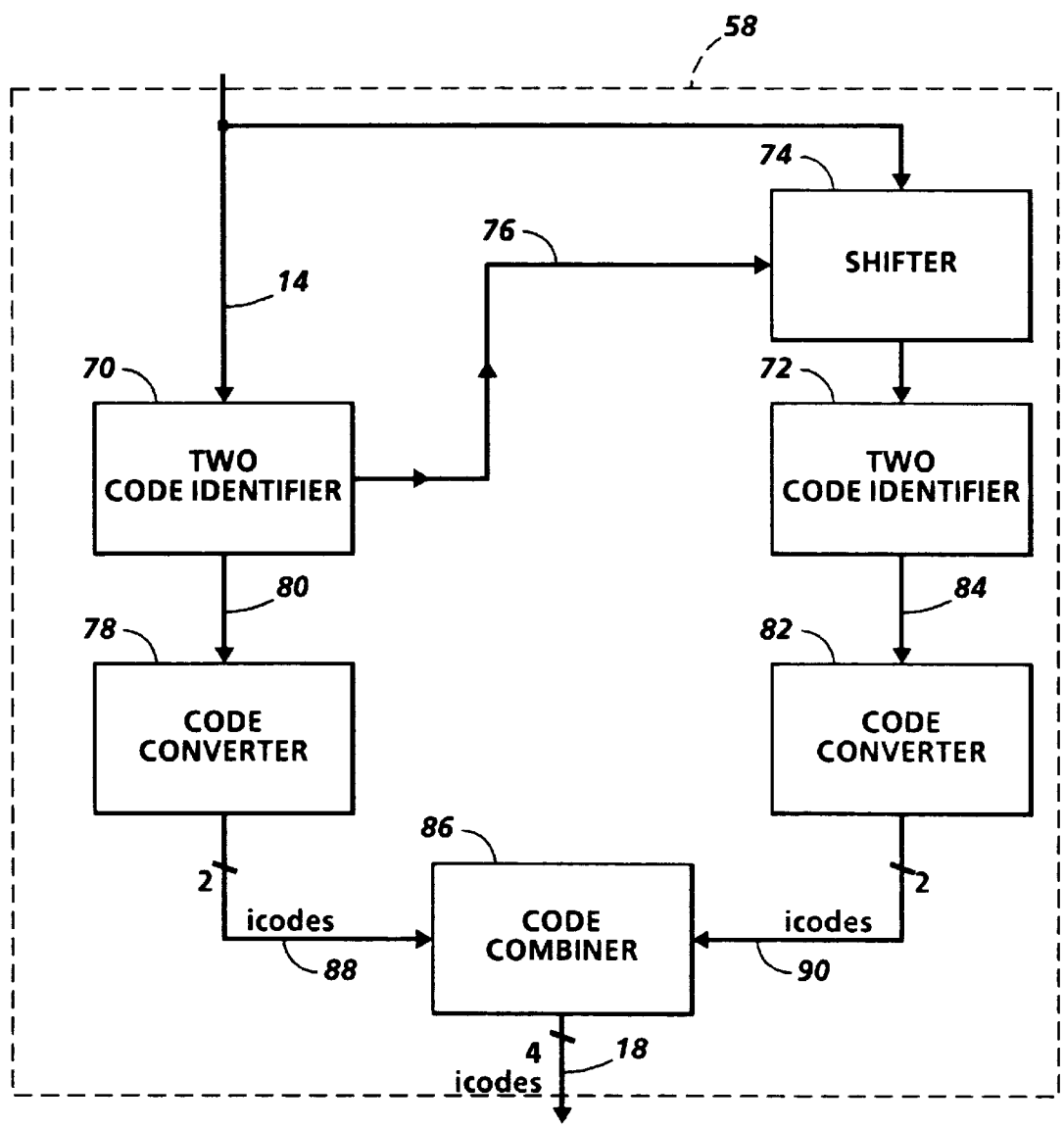
FIG. 5 shows a detailed block diagram of the PVSH code converter.

Referring to FIG. 5, there is shown a detailed block diagram of the PVSH code converter 58. The PVSH code converter 58 has to identify four codes at each clock cycle. In this invention, a two code identifier lookup table has been generated which has all the different combinations of two codes one after the other. Therefore, by matching the bits from the incoming codes to one of these combinations, in one attempt, two codes will be identified.

The PVSH code converter 58, has two blocks 70 and 72. Each one of the blocks 70 and 72 is a two code identifier lookup table. The two code identifier block 70 finds the first two codes and sends out the total number of bits of those two codes to shifter 74 via line 76. Shifter 74 shifts the 30 bits received from the alignment and shifter 52 (FIG. 3) by the total number of the bits from the first two codes. Then the shifted data will be sent to two code identifier 72 where the third and fourth codes are identified. The first two codes from two code identifier 70 will be sent to the code converter 78 via line 80 and the two codes from two code identifier 72 will be sent to code converter 82 via line 84. The code converter blocks 78 and 82 each convert the two identified codes into two fixed length intermediate codes. As a result, two intermediate codes icodeA and icodeB will be sent from code converter 78 to code combine 86 via line 88 and the two intermediate codes icodeC and icodeD will be sent from code converter 82 to the code combine 86 via line 90. All together 4 intermediate codes icodeA, icodeB, icodeC and icodeD will be sent out from the code combine 86 via line 18.

Figure 6:
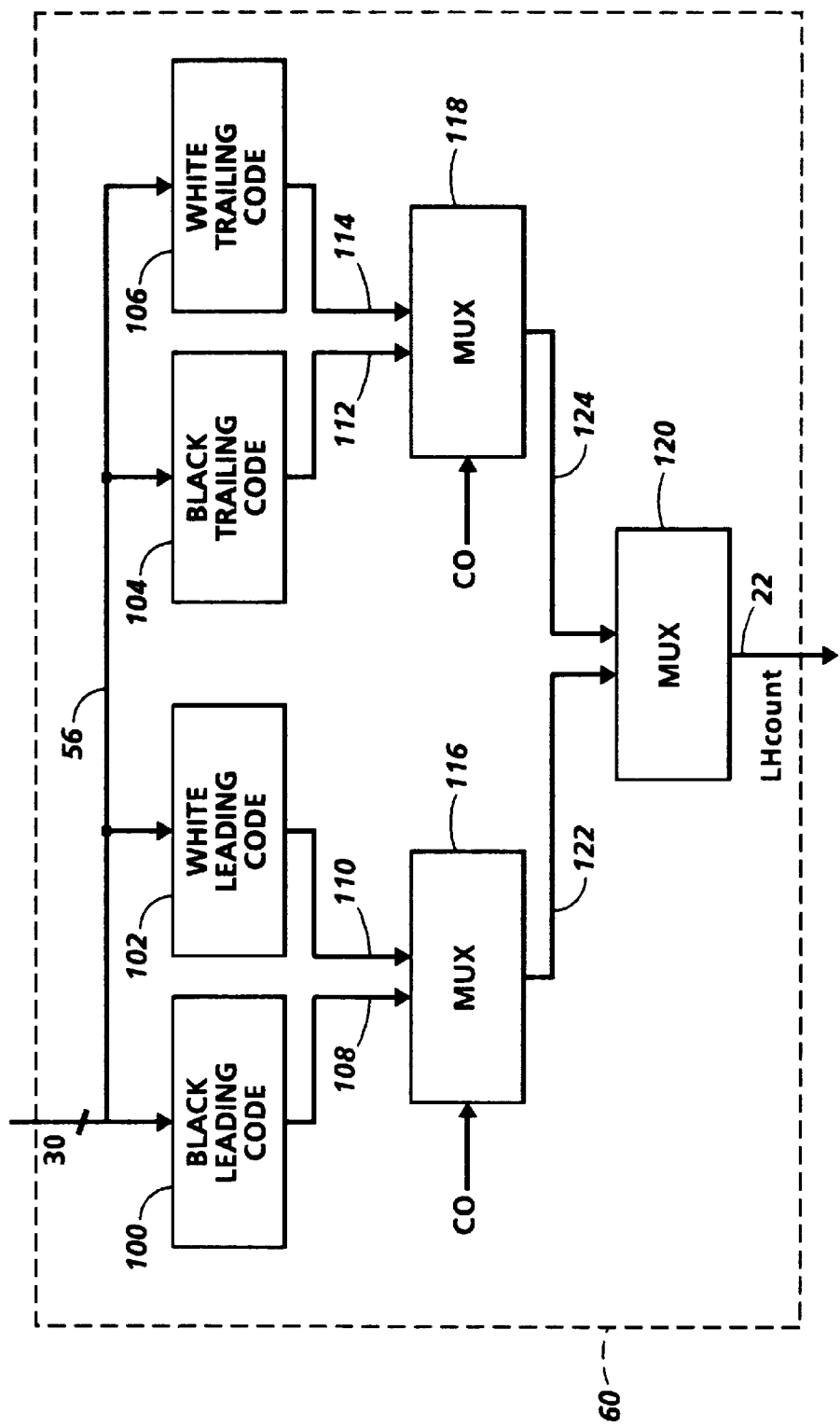
FIG. 6 shows a detailed block diagram of a long code converter of FIG. 3.

Referring to FIG. 6, there is shown a detailed block diagram of a long code converter 60 (FIG. 3). The long code converter block 60 receives 30 bits of data from the alignment and shifter block 52 (FIG. 3). The long code converter block 60 has two lookup tables 100 and 102 one for white leading codes and one for the black leading codes and two lookup tables 104 and 106 one for white trailing codes and one for the black trailing codes respectively.

The 30 bits data will be sent from alignment and shifter block 52 to blocks 100, 102, 104 and 106 via line 56. Each one of blocks 100 and 102 finds a leading code and sends out a count for that leading code. Also, each one of blocks 104 and 106 finds a trailing code and sends out a count for that code. Block 100, 102, 104 and 106 send out the counts on lines 108, 110, 112 and 114 respectively. Depending on the color of the code, MUX (multiplexer) 116 will select one of the counts 108 or 110 for the leading code and MUX 118 will select one of the counts 112 or 114 for the trailing code. The count for the leading code will be sent to the MUX 120 via line 122 and the count for the trailing code will be sent to MUX 120 via line 124. MUX 120, sends the LHcount (long horizontal count) via line 22 to long code decoder 20 (FIG. 1).

Referring back to FIG. 3, the uncompressed data buffer 62 is used to store the uncompressed data in between the codes. The uncompressed buffer 62 holds the uncompressed data Ucdata 24 and its count Ucdelta 25 and sends them to data expand block 26 at the appropriate time.

Figure 7:
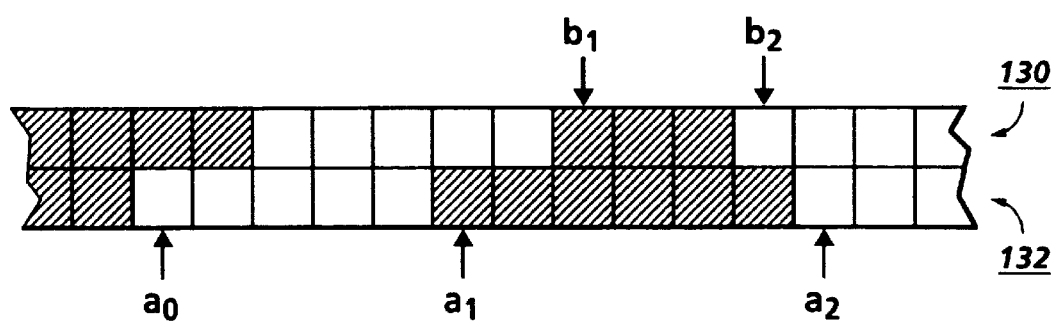
FIG. 7 shows a portion of previous line data and a corresponding portion of current line data.

In order to comprehend the encoder of this invention, it is necessary to study the conventions used in CCITT algorithm. Referring to FIG. 7, there is shown a portion of previous line data 130 and a corresponding portion of current line data 132. On the current line 132, $a_0$ represents the starting position of encoding. At the start of the line, $a_0$ is set on an imaginary white position situated just before the first element on the current line. During coding of the current line 132, the position of $a_0$ is defined by the previous coding mode. On the current line 132, $a_1$ represents the next change of color to the right of $a_0$ and opposite color to $a_0$. Also $a_2$ represents the next change of color to the right of $a_1$. On the previous line 130, $b_1$ represents the first change of color to the right of $a_0$ and of opposite color to $a_0$ and $b_2$ represents the next change of color to the right of $b_1$.

Figure 8:
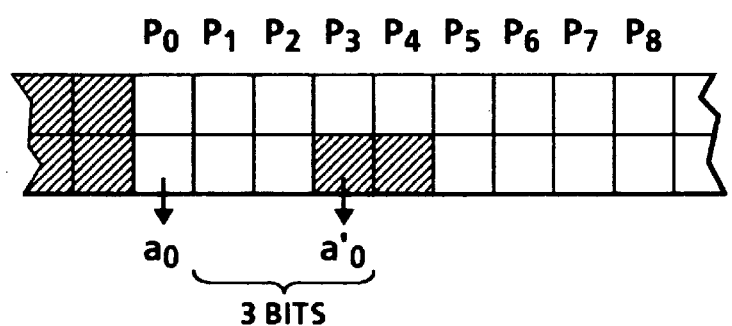
FIG. 8 shows an example of a code which generates three bits of decompressed data.

In addition, in this invention, a bit assignment is given to the bits on the previous line data. The bit assignment of the previous line is based on the starting position $a_0$. Referring to FIG. 8, $P_0$ is a bit on the previous line which has the same position as $a_0$ (right above $a_0$) and $P_1$, $P_2$, $P_3$, $P_4$, $P_5$, $P_6$, $P_7$ and $P_8$ are the consecutive bits following bit $P_0$ and to the right of $P_0$.

Figure 9:
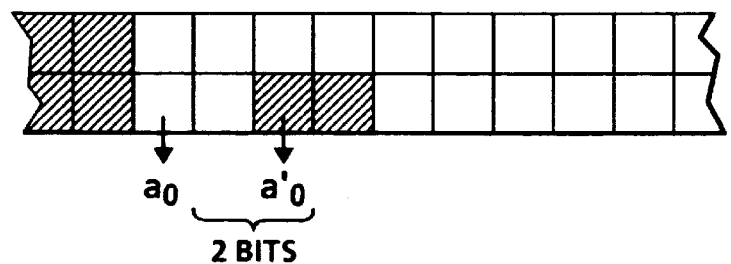
FIG. 9 shows an example of a code which generates two bits of decompressed data.

The parallel decoders 16 (FIG. 1) have to decode four codes in parallel. Since the length of decompressed data from each code is not known, parallel decoding becomes complicated. For example, referring to FIG. 8, there is shown an example of a code which generates three bits of decompressed data. In this example, the $a_0$ is starting position for the code which has generated 3 bits of decompressed data. The starting position for the following code $a_0'$ will be three positions after $a_0$. However, referring to FIG. 9, if the first code generates two bits of data, then the starting position $a_0'$ of the following code will be two bits away from $a_0$. Not knowing the number of the decompressed bits from each code creates a problem for selecting the starting position for the following codes.

In this invention, different possibilities have been considered. The parallel decoders 16 (FIG. 1) receive icodeA, icodeB, icodeC and icodeD. IcodeA can either generate four bits or more, three bits, two bits or one bit of decompressed data. If icodeA generates four bits or more, then the decompressed data from icodeA will be selected and the decompressed data from the following intermediate code or codes will be ignored in the current clock cycle. The ignored intermediate codes will be decompressed on the following clock cycle or clock cycles. However, if icodeA generates less than four bits of decompressed data, three possible conditions exists. IcodeA may generate one bit in which case the starting position for the following code will be one position after $a_0$. IcodeA may generate two bits of data in which case the starting position for icodeB will be two bits away from $a_0$. Finally, icodeA may generate three bits of data in which case the starting position for icodeB will be three bits away from $a_0$. In order to have the results ready for every condition, icodeB will be decoded assuming three different starting positions.

The combined decompressed data from both icodeA and icodeB can also be less than four bits. In this case, the decompressed data from icodeA and icodeB should be combined with the decompressed data from the following code icodeC. If the combination of icodeA and icodeB generate less than four bits of data, there are only two possibilities. Either they have generated two bits or three bits of decompressed data. Therefore, the starting position for icodeC is either two bits away from $a_0$ or three bits away from $a_0$. In order to have the results ready for every condition, icodeC will be decoded assuming two different starting positions.

Finally, if the combined decompressed data from icodeA, icodeB and icodeC generate less than four bits of decompressed data, then they must have generated three bits of data. In this case the decompressed data from icodeA, icodeB and icodeC will be combined with the decompressed data of icodeD. Therefore, decoder D has a starting position three bits away from $a_0$.

Figure 10:
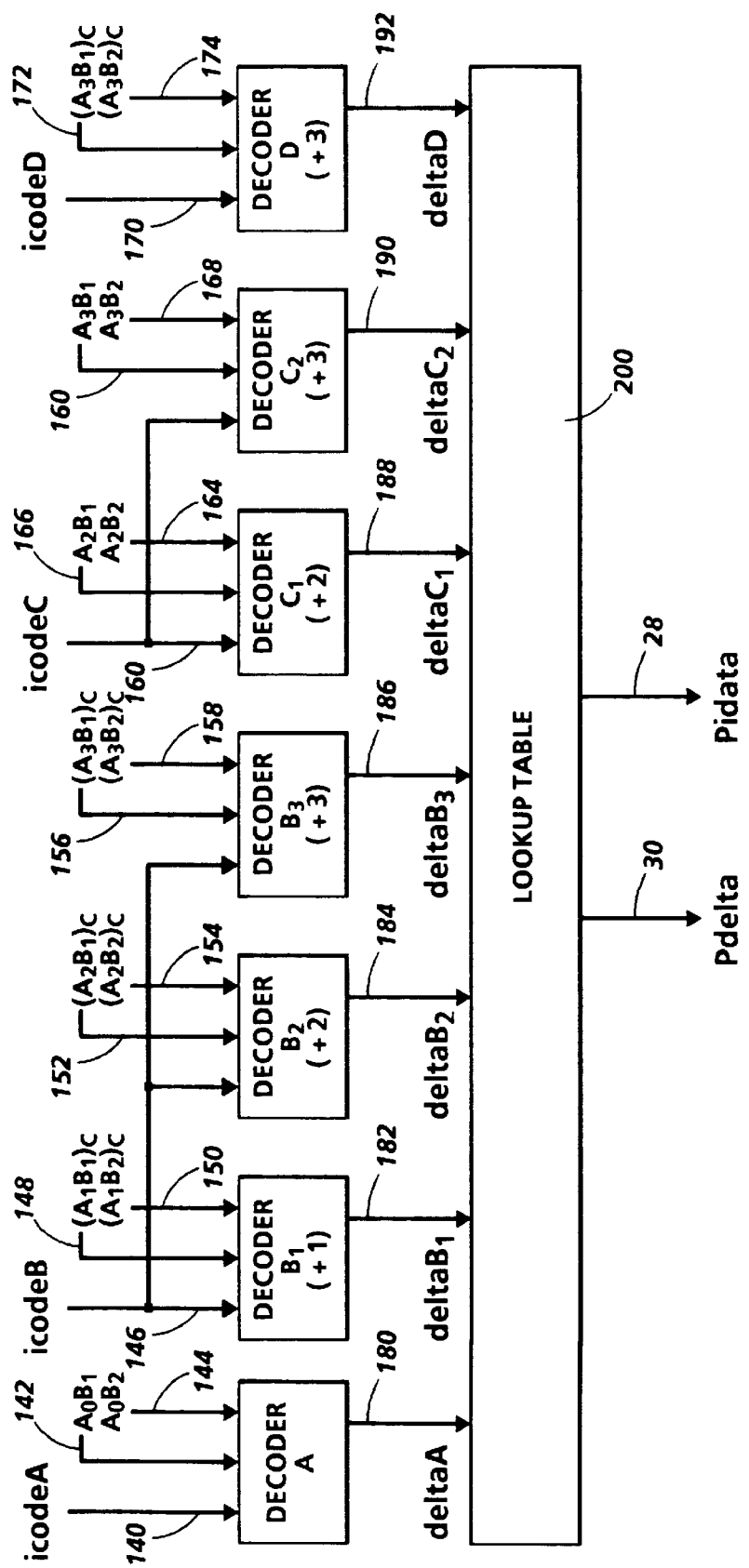
FIG. 10 shows a detailed block diagram of the parallel decoder of FIG. 1.

Referring to FIG. 10, there is shown a detailed block diagram of the parallel decoder 16 of FIG. 1. The parallel decoder 16, has seven decoders A, $B_1$, $B_2$, $B_3$, $C_1$, $C_2$ and D. Among the seven decoders, there is one decoder A for icodeA. There are three decoders $B_1$, $B_2$ and $B_3$ for icodeB and two decoders $C_1$ and $C_2$ for icodeC and one decoder for icodeD. Decoder $B_1$ assumes that icodeA has generated only one decompressed data, decoder $B_2$ assumes that icodeA has generated two bits of decompressed data and decoder $B_3$ assumes that icodeA has generated three bits of decompressed data. Decoder $C_1$ assumes that icodeA and icodeB together have generated only two bits of data and decoder $C_2$ assumes that icodeA and icodeB together have generated three bits of decompressed data. Finally, decoder D assumes that icodeA, icodeB and icodeC together have generated three bits of decompressed data.

It should be noted that hereinafter the term "decoder B" shall mean one of the decoders $B_1$, $B_2$ or $B_3$ and the term "decoder C" shall mean one of the decoders $C_1$ or $C_2$.

In operation, icodeA is decompressed regardless of the other intermediate codes. However, icodeB, icodeC and icodeD will be decoded in parallel with icodeA for every possible condition between the four intermediate codes. Once the icodeA is decoded, the result for all the possible conditions between the four codes are ready and depending on the number of decompressed data being generated by icodeA, a proper combination of the decompressed data will be selected to assure a minimum of four bits of decompressed data are being generated at each clock cycle.

Referring to FIG. 11, there is shown a table of all the possible conditions between the four codes. In this table, each column represents the length of the decompressed data of each decoder. For example, condition 23 shows that decoder A has generated 4 bits or more decompressed data. In this condition, the output from decoders B, C and D will be ignored and the decompressed data from decoder A will be sent out. The ignored intermediate codes from decoders B, C and D will be decompressed on the following clock cycle or clock cycles.

As another example, condition 19 shows that decoder A has generated 3 bits of data. In this condition, the result from decoder A has to be combined with the result from decoder $B_3$ since the starting position of decoder $B_3$ is 3 bits away from the starting position of decoder A. In FIG. 11, the + sign represents that the uncompressed data may have more bits than the number shown in the table. In condition 19, the result from decoder $B_3$ might have one bit or more. Therefore, if it is combined with the result from decoder A, the combined result will be four or more bits of decompressed data.

As another example, condition 11 shows that the result from decoder A is 2 bits and therefore it should be combined with result from decoder $B_2$ which has its starting position two bits away from the staring position of decoder A. However, since the result from decoder $B_2$ is only one bit, the combined results from decoder A and decoder $B_2$ will be three bits. Therefore, the combined result from decoder A and decoder $B_2$ should be combined with the result of decoder $C_2$ which has its starting position three bits away from the stating position of decoder A.

In the table of FIG. 11, P represents a pass code and Pdelta represents the total number of combined decompressed bits in each clock cycle. The function of P and Pdelta in this table will be described in a greater detail hereinafter.

Referring back to FIG. 10, the parallel decoders receive the icodes and they generate an intermediate data and a count for the length of the decompressed data. In order to decode a code, the decoder has to have the $a_0 b_1$ and $a_0 b_2$ for each code. Since the length of each code is not known, finding $a_0 b_1$ and $a_0 b_2$ for icodeB, icodeC and icodeD is not possible except by the aforementioned assumptions. Therefore, the $a_0 b_1$ and $a_0 b_2$ for each code can be determined for every different possibility.

For example, referring to FIG. 12, there is shown a simplified table which shows different possibilities of four bits $P_0$, $P_1$, $P_2$ and $P_3$ from the previous line with respect to the starting position $a_0$. In the 1st portion of FIG. 12, $a_0$ is 0 and the four bits $P_0$, $P_1$, $P_2$ and $P_3$ from the previous line are changed. As it can be observed, there are 16 different possibilities between $P_0$, $P_1$, $P_2$ and $P_3$. Since $a_0$ is 0, the $a_0 b_1$ and $a_0 b_2$ are known for each condition. In the 2nd portion, $a_0$ is 1 and the four bits $P_0$, $P_1$, $P_2$ and $P_3$ from the previous line are changing. The two different portions of this table provide all the possible combinations between $a_0$, $P_0$, $P_1$, $P_2$ and $P_3$. Therefore, by having $a_0$, $P_0$, $P_1$, $P_2$ and $P_3$ and finding a match for them, the $a_0 b_1$ and $a_0 b_2$ for that condition can be defined.

It should be noted that for the purpose of simplicity and clarification, this table is prepared for four bits $P_0$, $P_1$, $P_2$ and $P_3$ of the previous line. However, since the disclosed embodiment of this invention requires 9 bits of pervious line data at each clock cycle, the table on FIG. 12 has to be expanded by well known methods to provide all the possibilities between $P_0$, $P_1$, $P_2$, $P_3$, $P_4$, $P_5$, $P_6$, $P_7$ and $P_8$. By expanding the table to 9 bits of previous line data each portion of table will have 512 conditions.

Referring to FIG. 1, the expanded table of FIG. 11 is stored in the previous line processor 38. By having all the possibilities available, $a_0 b_1$, and $a_0 b_2$ for different decoders can be provided. However, it should be noted that for different decoders, the starting position is different and the bit assignment of the previous line data is based on the starting position of each decoder. Since the starting position for different decoders is different, a generic term $A_X B_1$ is assigned to $a_0 b1$ and a generic term $A_X B_2$ is assigned to $a_0 b_2$.

Figure 13:
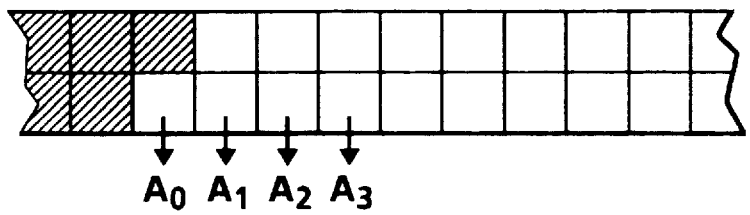
FIG. 13 shows the starting position of different decoders.

Each decoding unit receives an icode and a corresponding $(A_X B_1)$ and $(A_X B_2)$ or $(A_X B_1)_C$ and $(A_X B_2)_C$ value. The $A_X$ denotes the starting position of each decoder in the current line. Referring to FIG. 13, the position of $A_X$ for different decoders is as follows: $A_0$ for decoder A, $A_1$ for decoder $B_1$, $A_2$ for decoder $B_2$, $A_3$ for decoder $B_3$, $A_2$ for decoder $C_2$, $A_3$ for decoder $C_3$, $A_3$ for decoder D. $A_1$ is one bit after $A_0$, $A_2$ is two bits after $A_0$ and $A_3$ is three bits after $A_0$.

It should be noted that the notation of $A_1$, which is the starting position for encoder B, is different than $a_1$ from the CCITT standard notations, where $a_1$ is the next change of color in the current line. However, $B_1$ and $B_2$ are the same as $b_1$ and $b_2$ of the CCITT standards respectively.

$A_X B_1$ is defined as the distance between the starting position and the first change of color in the previous line and $A_X B_2$ is defined as the distance between the starting position and the second change of color on the previous line. $(A_X B_1)_C$ and $(A_X B_2)_C$ are the same as $A_X B_1$ and $A_X B_2$ with the exception of the color. For the $(A_X B_1)_C$ and $(A_X B_2)_C$, the starting position has the opposite color to the starting position of $A_X B_1$ and $A_X B_2$.

Figure 14:
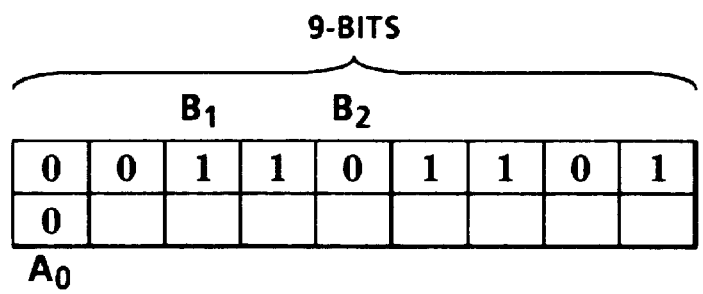
FIG. 14 shows the starting position of encoder A with respect to the data from the previous line.

Referring to FIGS. 14–19, there are shown the relationship between the starting position for each encoder and the color change on the previous line. Referring to FIG. 14, $A_0$ is the starting position for encoder A and depending on if the color of that bit is white (0), a color change from 0 to 1 to the right of $A_0$ on the previous line will define $B_1$ and a color change from 1 to 0 to the right of $B_1$ on the previous line will define $B_2$. However, if the color of $A_0$ is black (1), a color change from 1 to 0 to the right of $A_0$ will define $B_1$ on the previous line and a color change from 0 to 1 to the right of B1 on the previous line will define $B_2$. In the example of FIG. 14, the color of $A_0$ is white (0). As it can be observed, decoder A will use 9 bits of previous line data.

Figure 15:
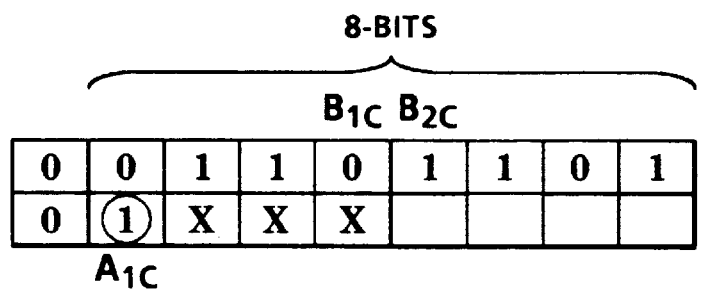
FIG. 15 shows the starting position of encoder B1 with respect to the data from the previous line.

Referring to FIG. 15, $A_1$ is the starting position for the decoder $B_1$. The result from decoder $B_1$ will be used only when the decoder A generates one bit of data. Therefore, decoder $B_1$ decodes the incoming intermediate code assuming that the starting position is one bit after $A_0$ and since every code except the pass code causes a change of color, the $A_{1C}$ will have a color opposite to the color of $A_0$. The condition for the pass code will be described hereinafter. It should be noted that $A_{1C}$, $A_{2C}$, $A_{3C}$ are the same as $A_X$ in $(A_X B_1)_C$ or in $(A_X B_2)_C$.

In the example of FIG. 15, the color of $A_{1C}$ is black (1). The reason 1 is circled is to distinguish that $A_{1C}$ is an assumption. If decoder A generates one bit, then this assumption must be correct. As it can be observed, decoder $B_1$ will use 8 bits of previous line data.

It should be noted that in the description of FIGS. 15–19, the condition for pass code is not discussed since the pass code needs a separate discussion which will be described in greater detail once the function of the decoders A, B, C and D are described in detail.

It should also be noted that in FIGS. 15–19, the X denotes that the value of the bit is not known.

Referring to FIG. 16, $A_2C$ is the starting position for the decoder $B_2$. The result from decoder $B_2$ will be used only when the decoder A generates two bits of data. Therefore, decoder $B_2$ decodes the incoming intermediate code assuming that the starting position is two bits after $A_0$ and since every code except the pass code causes a change of color, the $A_{2C}$ will have a color opposite to the color of $A_0$. In the example of FIG. 16, the color of $A_{2C}$ is black (1). The reason 1 is circled is to distinguish that $A_{2C}$ is an assumption. If decoder A generates two bits, then this assumption must be correct. As it can be observed, decoder $B_2$ will use 7 bits of previous line data.

Referring to FIG. 17, $A_{3C}$ is the starting position for the decoder $B_3$. The result from decoder $B_3$ will be used only when the decoder A generates three bits of data. Therefore, decoder $B_3$ decodes the incoming intermediate code assuming that the starting position is three bits after $A_0$ and since every code except the pass code causes a change of color, the $A_{3C}$ will have a color opposite to the color of $A_0$. In the example of FIG. 17, the color of $A_{1C}$ is black (1). The reason 1 is circled is to distinguish that $A_{3C}$ is an assumption. If decoder A generates two bits, then this assumption must be correct. As it can be observed, decoder $B_3$ will use 6 bits of previous line data.

Referring to FIG. 18, $A_2$ is the starting position for the decoder $C_1$. The result from decoder $C_1$ will be used only when the decoder A together with decoder B generate two bits of data. Therefore, decoder $C_1$ decodes the incoming intermediate code assuming that the starting position is two bits after $A_0$ and since every code except the pass code causes a change of color and since decoders A and B have decoded two codes, $A_2$ will have a color same as $A_0$. In the example of FIG. 18, the color of $A_2$ is white (0). The reason 0 is circled is to distinguish that $A_2$ is an assumption. If decoders A and B generate two bits, then this assumption must be correct. As it can be observed, decoder C1 will use 7 bits of previous line data.

Referring to FIG. 19, $A_3$ is the starting position for the decoder $C_2$. The result from decoder $C_2$ will be used only when the decoder A together with decoder B generate three bits of data. Therefore, decoder $C_2$ decodes the incoming intermediate code assuming that the starting position is three bits after $A_0$ and since every code except the pass code causes a change of color and since decoders A and B have decoded two codes, $A_3$ will have a color the same as $A_0$. In the example of FIG. 19, the color of $A_3$ is white (0). The reason 0 is circled is to distinguish that $A_3$ is an assumption. If decoders A and B generate three bits, then this assumption must be correct. As it can be observed, decoder $C_1$ will use only 2 bits of current line data and only 6 bits of previous line data.

Referring back to FIG. 17, decoder D uses $A_{3C}$. The result from decoder D will be used only when the decoder A together with decoders B and C generate three bits of data. Therefore, decoder D decodes the incoming intermediate code assuming that the starting position is three bits after $A_0$ and since every code except the pass code causes a change of color and since decoders A and B and C have decoded three codes, $A_3$ will have a color opposite to the color of $A_0$. Therefore, the starting position of decoder D is black (1) as in FIG. 17. Decoder D will use only 2 bits of current line data and only 5 bits of previous line data.

Once the $A_X B_1$, $A_X B_2$, $(A_X B_1)_C$ and $(A_X B_2)_C$ are defined for each different possibility, then the length of each code can be defined. For the pass code, the length of the decompressed data is equal to $A_X B_2$ or $(A_X B_2)_C$. For the vertical code, the length of the decompressed data is equal to the $A_X B_1$ plus the two least significant bits of the intermediate code or $(A_X B_1)_C$ plus the two least significant bits of the intermediate code. Finally, for the short horizontal leading code, the length of the decompressed data is equal to the three least significant bits of the intermediate short horizontal leading code and for the short horizontal trailing code, the length of the decompressed data is equal to the three least significant bits of the intermediate short horizontal trailing code.

Therefore, by having either the $A_X B_1$, $A_X B_2$, $(A_X B_1)_C$ and $(A_X B_2)_C$ or the three least significant bits from the intermediate codes, one can provide the length of decompressed data for each PVSH intermediate code.

Referring back to FIG. 10, depending on the starting position of each decoder, a proper $A_X B_1$, $A_X B_2$, $(A_X B_1)_C$ and $(A_X B_2)_C$ will be sent to each decoder. Decoder A receives the intermediate code icodeA 140 from the code identify and convert block 12 (FIG. 1), $A_0 B_1$ 142 and $A_0 B_2$ 144 from the previous line processor 38 (FIG. 1). Decoder A generates a length of decompressed data for the intermediate code icodeA and sends it out on deltaA. Decoder $B_1$, $B_2$ and $B_3$ receive icodeB 146 from the code identify and convert block 12 (FIG. 1) and $(A_X B_1)_C$ and $(A_X B_2)_C$ from the previous line processor 38 (FIG. 1). The reason decoders B receive the opposite color $(A_X B_1)$ and $(A_X B_2)$ is that decoders $B_1$, $B_2$ and $B_3$ will be used once decoder A decodes a code which means there has been a color change and therefor the next code should be decoded by an opposite color to the color of icodeA. Decoder $B_1$ receives $(A_1 B_1)_C$ 148 and $(A_1 B_2)_C$ 150. Decoder $B_1$ generates a length of decompressed data for the icodeB and adds 1 to the length of data of icodeB and sends the result on deltaB$_1$. The reason for adding one to the length of the data from icodeB is that the result from decoder $B_1$ will be used only when the decoder A has generated one bit. Therefore, by adding one, the total number of decompressed data generated by the decoders A and $B_1$ will be sent on deltaB$_1$.

Decoder $B_2$ receives $(A_2 B_1)_C$ 152 and $(A_2 B_2)_C$ 154. Decoder $B_2$ generates a length of decompressed data for the icodeB and adds 2 to the length of decompressed data for icodeB and sends the result on deltaB$_2$. The reason for adding two to the length of the decompressed data from icodeB is that the result from decoder $B_2$ will be used only when the decoder A has generated two bits. Therefore, by adding two, the total number of decompressed data generated by the decoders A and $B_2$ will be sent on delta$B_2$.

Decoder $B_3$ receives $(A_3B_1)_C$ 156 and $(A_3B_2)_C$ 158. Decoder $B_3$ generates a length of decompressed data for the icodeB and adds 3 to the length of decompressed data for icodeB and sends the result on delta$B_3$. The reason for adding three to the length of the decompressed data from icodeB is that the result from decoder $B_2$ will be used only when the decoder A has generated three bits. Therefore, by adding three, the total number of decompressed data generated by the decoders A and $B_2$ will be sent on delta$B_3$.

Decoder $C_1$ and $C_2$ receive icodeC 160 from the code identify and convert block 12 (FIG. 1) and $A_XB_1$ and $A_XB_2$ from the previous line processor 38 (FIG. 1). The reason the decoders $C_1$ and $C_2$ receive $A_XB_1$ and $A_XB_2$ without a color change with respect to the color of icodeA is that decoders $C_1$ and $C_2$ will be used once decoders A and B decode two codes which means there has been two color changes one from $A_0$ to the opposite of $A_0$ and one from the opposite of $A_0$ back to $A_0$ and therefor the next code should be decoded by the same color as the color of $A_0$. Decoder $C_1$ receives $A_2B_1$ 162 and $A_2B_2$ 164. Decoder $C_1$ generates a length of decompressed data for the icodeC and adds 2 to the length of decompressed data for icodeC and sends the result on delta$C_1$. The reason for adding two to the length of the decompressed data from icodeC is that the result from decoder $C_1$ will be used only when the decoder A and B together generate two bits of data. Therefore, by adding two, the total number of decompressed data generated by the decoders A, B and C, will be sent on delta$C_1$.

Decoder $C_2$ receives $A_3B_1$ 166 and $A_3B_2$ 168. Decoder $C_2$ generates a length of data for the icodeC and adds 3 to the length of decompressed data for icodeC and sends the result on delta$C_2$. The reason for adding three to the length of the decompressed data from icodeC is that the result from decoder $B_2$ will be used only when the decoder A and B together generate two bits of data. Therefore, by adding two, the total number of decompressed data generated by the decoders A, B and $C_2$ will be sent on delta$C_2$.

Decoder D receive icodeD 170 from the code identify and convert block 12 (FIG. 1) and $(A_XB_1)_C$ and $(A_XB_2)_C$ from the previous line processor 38 (FIG. 1). The reason the decoder D receives the opposite color $(A_XB_1)$ and $(A_XB_2)$ is that decoder $D_3$ will be used once decoders A, B and C decode three codes which means there have been three color changes from $A_0$ to the opposite of $A_0$, then from opposite of $A_0$ back to $A_0$ and from $A_0$ to the opposite of $A_0$. Therefore, icodeD has to be decoded by the opposite color to the color of $A_0$. Decoder D generates a length of decompressed data for the icodeD and adds 3 to the length decompressed data for icodeD and sends the result on deltaD. The reason for adding three to the length of the decompressed data from icodeD is that the result from decoder D will be used only when the decoders A, B and C together generated three bits of decompressed data. Therefore, by adding one, the total number of decompressed data generated by the decoders A, B and C will be sent on deltaD.

Referring back to FIG. 3, when the PVSH code converter 58 receives a pass code, it will convert the pass code into intermediate code and will send out a dummy intermediate code following the intermediate code for the pass code. The code right after the pass code will be converted to an intermediate code and it will be sent out after the dummy intermediate code. Therefore, once the intermediate codes are sent to the parallel decoders 16, the intermediate code for the pass code and intermediate code of the following code to the pass code will always have a dummy intermediate code in between.

Referring to FIG. 10, the reason for sending a dummy intermediate code followed by and intermediate code for the pass code is that a pass code does not cause a color change and therefore, the code following a pass code will have the same color as the color of the pass code. As a result, a pass code and its following code should not be decoded by two consecutive decoders.

For example, if icodeA is an intermediate code for a pass code, then the intermediate code of the code which follows the pass code should not be decoded by decoder B since decoder B assumes a change of color. Since in this invention, a dummy code which will be ignored is inserted between the intermediate code of a pass code and the intermediate code of the code following the pass code, the dummy code will go to the decoder B and the intermediate code for the code following the pass code will go to the decoder C. The result from decoder B which received a dummy code will be ignored and the result from decoder A will be combined with the result from decoder C which received the intermediate code for the code following the pass code. Since decoder C has a color assumption which is the same as the color of the starting position of decoder A, combining the result from decoder A with decoder C provide the correct decoding for a pass code and its following code.

It should be noted that pass code can not generate one bit. The minimum number of bits of a decompressed data from a pass code is two bits. Therefore, not using the decoder B will not cause a problem.

As another example, if icodeB happens to be the intermediate code for a pass code, then decoder B will receive icodeB, decoder C will receive a dummy intermediate code and decoder D will receive the intermediate code for the code following the pass code. The result from decoder C which received a dummy code will be ignored and the result from decoder B will be combined with result from decoder D which received the intermediate code for the code following the pass code. Since decoder D has a color assumption which is the same as the color of the starting position of decoder B, combining the result from decoder B with decoder D provide the correct decoding for a pass code and its following code. Again since a pass code can not generate one bit of decompressed data, not using decoder C will not generate a problem.

Referring back to FIG. 11, it should be noted that every time there is a pass code, the result from that decoder will be combined with the result from a decoder which is the second following decoder. For example, in condition 17, icodeA is an intermediate code of a pass code which generates two bits of data. In this condition, the result from decoder A will be combined with result from decoder $C_1$. However, in condition 7, the icodeA generates 1 bit of decompressed data and therefore it has to be combined with the result form decoder $B_1$. In this condition, the icodeB happens to be an intermediate code for a pass code which generates two bits of decompressed data. Therefore, the result from decoder A and decoder $B_1$ have to be combined with the result from decoder D rather than decoder $C_2$ since decoder D has the same color assumption on its starting position as the color of the starting position of decoder $B_3$.

Also, in FIG. 11, Pdelta is the total number of bits of decompressed data generated in that clock cycle. As it can be observed, Pdelta is taken from the last decoder that its result is combined with the result from the previous decoders. For example, in condition 5 the result from decoders A and $B_1$ are combined with the result from decoder $C_2$. Therefore, delta is taken from decoder $C_2$. As another example, in condition 16, the result from decoders A and $C_1$ should be combined with the result from decoder D and therefore delta is taken from decoder D. Yet as another example, in condition 23 since the result from decoder A has 4 or more bits, it will be sent out without combining it with the result from any decoder. In this condition 23, delta is taken from decoder A.

Referring back to FIG. 10, deltaA 180, deltaB$_1$ 182, deltaB$_2$ 184, deltaB$_3$ 186, deltaC$_1$ 188, deltaC$_2$ 190 and deltaD 192 are all sent to look up table 200. It should be noted that along with each delta, the color of that code will also be sent out. However, for the purpose of simplicity, only delta from each decoder is shown. Lookup table 200 contains the data of FIG. 11. Based on different conditions between the delta from different decoders, the lookup table 200 selects a proper Pdelta and a proper Pidata. The lookup table 200 sends the Pdelta via line 30 and the Pidata via line 28 to data expand block 26 (FIG. 1).

Referring back to FIG. 1, the data expand block 26 which receives the Pdelta 30 and Pidata 28 from the parallel decoders 16 and the LHdelta 34 and LHidata 32 from the long code decoder 20 has to expand the intermediate data based on the received delta (count of the decompressed data) in order to generate the decompressed data.

In order to understand the expansion of the intermediate data it is necessary to study the generation of the intermediate data.

Referring back to FIG. 11, the intermediate data for PVSH codes has been generated based on different conditions. The intermediate data has a fixed length of 4 bits (bit0, bit1, bit2 and bit3) and it has to be expanded to generate the decompressed data. The intermediate data is based on the number of the bits from each decoder and the color change. For example, in condition 13, the result from decoder A is 2 bits and the result from decoder B$_2$ is also 2 bits. In this condition, bit3 and bit2 of the intermediate data represent the 2 bits from decoder A and therefore bit 3 shows a 0 and bit2 shows a color change from 0 to 1 on the second bit. Bit1 and bit0 represent two bits generated by decoder B$_2$. Bit1 shows the same color (1) carried through the next data and bit 0 shows the end of the data which shows a color change (0).

In FIG. 11, P represents a pass code and + represents more than. Therefore, in condition 13, if decoder B$_2$ generates more than 2 bits of data, the intermediate data will be the same as intermediate data shown for condition 13 however, when it is expanded, it will contain the more bits of uncompressed data. In condition 13, if decoder B$_2$ generates 2 bits of data, the intermediate data will not be expanded since the intermediate data contains the correct decompressed data. However, if the decoder B$_2$ generates more than two bits of data, then the intermediate data need to be expanded. The expansion is always done on bit1. For example, in condition 13 if decoder B$_2$ generates 5 bits, then bit1 has to be repeated three times to generate the uncompressed data.

The intermediate data contains the correct uncompressed data for the result from different decoders that are used except the result from the last decoder used in the combination of decoders A, B, C and D. For the purpose of simplicity hereinafter the last decoder in the combination of decoders A, B, C and D will be called "last decoder". The result from the last decoder is compressed and it needs to be expanded. To expand the result from the last decoder, it is sufficient to repeat bit 1 by (Pdelta−4). Pdelta is the total number of decompressed data for that clock cycle and number 4 is the number of bits that the intermediate data has.

Therefore, in condition 13, if decoder B$_2$ generates 5 bits, then the Pdelta from deltaB$_2$ will be 7. Then Pdelta−4=7−4 which is 3. Then bit 1 will be repeated three times and therefore, after expansion, the uncompressed data will be 0111110. It should be noted that bit 1 will be repeated and they will be inserted between bit 1 and bit 0 (011-111-0).

As another example, in condition 21, the result from decoder A is 3P which means that the code is a pass code and has generated 3 bits. This result should be combined with the result from decoder C$_2$ which has generated 1 bit or more. The intermediate data for this condition is 0001. Bit3, bit2 and bit1 show a data of 3 bits and since this data is from a pass code, there will be no color change on bit1. Decoder C$_1$ has generated 1 bit and that will be shown by bit 0 which shows a color change from 0 to 1. This intermediate data does not need to be expanded. However, if decoder C$_2$ generates more than one bit data, then the intermediate data needs to be expanded. For example, if in condition 21, decoder C$_2$ generates 2 bits, then the intermediate data has to be expanded by Pdelta−4=(5−4=1). Then the decompressed data will be 00001 (000-0-1.

It should be noted that the table in FIG. 11 is based on $a_0$ being white (0). However, if the $a_0$ is black, the intermediate data will be inverted.

Furthermore, depending on the terminating color of the intermediate data on each clock cycle, the color of the intermediate code may be inverted on the following clock cycle. For example, if on the first clock cycle, in which the color of $a_0$ is assumed to be white (0), condition 7 exists, the terminating color on the intermediate code is 0. It should be noted that the terminating color is the color of bit 0. On the second clock cycle, if a condition such as condition 5 occurs, then the intermediate data has to be inverted since the decompressed data has to start with the same color as the terminating color from the previous clock cycle. Therefore, in this example, on the second clock cycle, the intermediate data for condition 5 has to be inverted from 1101 to 0010. As a result, the intermediate data for the second clock cycle will be 0010.

As another example, if at a certain clock cycle, condition 14 exists and the intermediate data is kept as 0111, then if on the following clock cycle, condition 19 occurs, then the intermediate data for condition 19 has to be inverted from 0010 to 1101. Therefore, in this example, the intermediate code for the clock cycle following the certain clock cycle will be 1101.

Referring back to FIG. 1, when there is a long horizontal code, the code identify and convert block 12 sends out a LHcount to the long code decoder 20. The long code decoder 20 divides the LHcount, received from MUX 126, by 8 and sends each division of the count on one clock cycle as LHdelta via line 34 and a proper intermediate data as LHidata via line 32 to the data expand block 26 until the LHcount is covered. The count on the last clock cycle covering the LHcount may be less than 8. For example, if the LHcount is 19, then the long code decoder 20 will send out a count of 8 on the first and second clock cycles and a count of 3 on the third clock cycle. These counts will be sent out on LHdelta 34 to the data expand block 26. The long code decoder 20 also generates a LHidata. The LHidata is a two bit intermediate data which needs to be expanded to provide the decompressed data for a long horizontal code.

Referring to FIG. 20, there is shown LHidata and the expanded LHidata (decompressed data) for different counts. If the LHdelta is 8 and the rest of the count will be sent on the following clock cycle, then for the clock cycle that 8 is sent out, the LHidata will be either 00 or 11 depending on if the data is white or black respectively. In this case, in order to expand the LHidata, bit 1 has to be repeated 6 times and inserted between bit 1 and bit 0 to generate 8 bits of decompressed data. When LHdelta is less than 8 bits, then on LHidata 01 or 10 will be sent out depending on if the color is white or black respectively. In this case, in order to expand the LHidata, bit1 has to be repeated to generate the number of bits of the count. For example in FIG. 20, the count less than 8 is selected to be 5. Therefore, bit 1 will be repeated three times (LHdelta−2=5−2=3) and it will be inserted between bit 1 and bit 0 in order to generate 5 bits of decompressed data.

Finally, if the LHdelta is exactly 8 which means that no more count will be sent out on the following clock cycle, then 01 or 10 will be sent out on bit 1 and bit 0 depending on if the data is white or black respectively. In this condition, in order to expand the LHidata, bit 1 has to be repeated 6 (LHdelta−2=8−2=6) times to generate an 8 bit decompressed data.

After the data expand block 26 expands the intermediate data from the parallel decoders or expands the intermediate data from the long code decoder, it will concatenate the decompressed data of each clock cycle to the decompressed data from the previous clock cycles and stores them until there are 32 bits of decompressed data and then it will send the 32 bits out as decompressed data.

It should be noted that when a long horizontal code is identified among the four codes received at each clock cycle, the intermediate PVSH codes prior to the long horizontal code will be sent to the parallel decoder 16 (FIG. 1) and the long code and its following codes will be held till the next clock cycle. In this case, since the parallel decoders 16 receive less than four codes, they may generate less than four bits of decompressed data. Therefore, at this clock cycle less than four bits of decompressed data may be sent out. However, on the following clock cycle, since the first code is a long horizontal code, there will be more than four bits of decompressed data.

It should also be noted that when the identified long horizontal code is the first code among the four codes received at each clock cycle or a long horizontal code is held from a previous clock cycle to be decoded on the current clock cycle which will be the first code among the four codes received at the current clock cycle, the long horizontal code will be sent to the long horizontal code decoder 20 (FIG. 1) and an ignore code will be sent to the parallel decoders 16 (FIG. 1). Once the parallel decoders 16 receive the ignore code, they will be inactivated and only the long code decoder 20 will decode one long horizontal code since the decompressed data of a long horizontal code will be more than four bits of decompressed data. The codes following the long horizontal codes will be held until the next clock cycle to be decoded.

It should further be noted that when the parallel decoders 16 are active, the long code decoder 20 is inactive.

Referring back to FIG. 1, the data expand block 26 also receives the uncompressed data Ucdata 24 and its count Ucdelta 25 from the code identify and convert block 12. Once the data expand block 26 receives the uncompressed data Ucdata 24, it will ignore the parallel decoders 16 and the long code decoder 20 and sends out the incoming uncompressed data unaltered. However, if there is an intermediate data from the parallel decoder, the data expand block selects the intermediate data of the parallel decoder and when there is a long code, the data expand selects the intermediate data from the long code decoder and when there is uncompressed data, it will select the uncompressed data.

Therefore, at any given clock cycle, either the parallel decoder 16 is active or the long code decoder 20 is active or the uncompressed data is being sent to the data expand block 26. It should be noted that when the uncompressed data is being sent to the data expand block 26, the parallel decoders 16 and the long code decoder 20 will be inactive.

Furthermore, if an uncompressed data is identified among the four codes received within one clock cycle, if the codes prior to the uncompressed data are PVSH codes they will be sent to the parallel decoders 16 and if they are long horizontal codes, they will be sent to the long horizontal code one at a time and the uncompressed data and its following codes will be held till the next clock cycle or clock cycles. Once the prior codes to the uncompressed data are decoded, then on the following clock cycle, the uncompressed data will be sent to the data expand block. During the clock cycle that the uncompressed data is being sent to the data expand block, the parallel decoders 16 and the long code decoder 20 will be inactive.

It should be noted that the data expand block receives the uncompressed data and concatenates the uncompressed data with the decompressed data from the previous clock cycles and stores the result until there are 32 bits of decompressed data available and then sends out the 32 bits of decompressed data.

It should also be noted that the disclosed decompressor of this invention can be designed to receive and decompress three codes in one clock cycle and send out in most cases three bits or more decompressed data or it can be designed to receive and decompress more than four codes in one clock cycle and send out in most cases a number of bits of decompressed data which is more than the number of received codes.

The uncompressed data will also be sent to the previous line processor to be stored for decompressing the following line.

The disclosed embodiment of this innovation is capable of decompressing CCITT, IBMMR and TIFF codes at the rate of 100–400 Mbits/sec.

We claim:

1. An apparatus for decompressing compressed image data comprising:

a) means for receiving a series of a given number of at least three codes in one clock cycle and identifying them as long horizontal codes or non-long horizontal codes, the given number of at least three codes equaling a desired given minimum number of bits of decompressed data to be generated during the same one clock cycle;

b) parallel decoding means operatively connected to said receiving means;

c) long code decoding means operatively connected to said receiving means;

d) said receiving means including means for sending, during the same one clock cycle, the identified long horizontal codes to said long code decoding means and sending, during the same one clock cycle, the identified non-long horizontal codes in a non-long horizontal code series of one or more non-long horizontal codes to said parallel decoding means;

e) said parallel decoding means having a plurality of decoding means for decoding in parallel during the same one clock cycle each of the non-long horizontal codes received during such cycle by said decoding means;

f) one of said plurality of parallel decoding means having a decoder being so constructed and arranged to receive the first code of the non-long horizontal code series, the remaining of said plurality of parallel decoding means being so constructed and arranged to receive all of the remaining codes in the non-long horizontal code series;

g) said parallel decoding means, for each of the remaining non-long horizontal codes received thereby, decoding during the same one clock cycle its respective remaining code for all possible conditions of the number of bits that can be generated during the same one clock cycle by the non-long horizontal codes preceding each respective one of the remaining codes, the possible conditions being a minimum cumulative number of bits that can be generated by the non-long horizontal code series preceding such respective one of the remaining codes up to one bit less than the desired given minimum number of bits of decompressed data to be generated during the same one clock cycle;

h) said parallel decoding means for each of the remaining codes of the non-long horizontal code series comprising a designated number of decoders equaling the number of all possible conditions of the number of bits that can be generated by the non-long horizontal codes preceding each respective one of the remaining codes, and when the designated number of the decoders for receiving a particular code is more than one, each of said decoders of said designated number of decoders decodes in parallel during the same clock cycle its respective code for a different particular one of the possible conditions;

i) non-long horizontal code decompressed data selecting means operatively connected to said parallel decoding means for selecting during the same one clock cycle:

$i_1$. the decompressed data of the first code in the non-long horizontal code series if either the first code generates at least the desired given minimum number of bits of decompressed data or the first codes is the only code in the non-long horizontal code series, $i_2$. the decompressed data of the first code in the non-long horizontal code series and the decompressed data for the second code in the non-long horizontal code series, which corresponds to the possible decompressed data condition that matches the actual number of bits generated by the decompressed data of the first code, if the number of bits of decompressed data generated by the first code is less than the desired given minimum number of bits and either the first two codes generate a cumulative number of bits of decompressed data which is at least the desired given minimum number of bits or the second code is the last code in the non-long horizontal code series, and $i_3$. the decompressed data of the first two codes in the non-long horizontal code series and any one or more of the codes in the non-long horizontal code series following the first two codes in the same manner as the selection of the decompressed data of the first two codes in the non-long horizontal code series if the cumulative number of bits of decompressed data generated by the first two codes is less than the desired given minimum number of bits, determined by either the first two codes and the one or more codes generating a cumulative total of at least the desired given minimum number of bits and the cumulative number of bits of decompressed data generated by the codes in the non-long horizontal code series prior to the last code for which the decompressed data is selected is less than the desired given minimum number of bits or the last code selected is the last code in the non-long horizontal code series, and j) long horizontal code decompressed data selecting means operatively connected to said long code decoding means for selecting the decompressed data of a long code sent to said long decoding means.

2. The apparatus for decompressing compressed image data in accordance with claim 1 wherein the given number of at least three codes is three codes and the given minimum number of bits is three.

3. The apparatus for decompressing compressed image data in accordance with claim 1 wherein the given number of at least three codes is four codes and the given minimum number of bits is four.

4. The apparatus for decompressing compressed image data in accordance with claim 1 wherein the given number of at least three codes is more than four codes and the given minimum number of bits is equal to the given number of codes.

5. The apparatus for decompressing compressed image data in accordance with claim 1 wherein said receiving means includes means:

a) for sending within the same clock cycle received, only one identified long horizontal code to said long code decoding means if such identified long horizontal code is the first code of the series of identified codes; and b) for sending within the same clock cycle received, a series of one or more consecutive identified non-long horizontal codes to said parallel decoding means if one of such identified non-long horizontal codes is the first code in the series of identified codes.

6. The apparatus for decompressing compressed image data in accordance with claim 5 wherein the given number of at least three codes is three codes and the given minimum number of bits is three.

7. The apparatus for decompressing compressed image data in accordance with claim 5 wherein the given number of at least three codes is four codes and the given minimum number of bits is four.

8. The apparatus for decompressing compressed image data in accordance with claim 5 wherein the given number of at least three codes is more than four codes and the given minimum number of bits is equal to the given number of codes.

9. The apparatus for decompressing compressed image data in accordance with claim 1 wherein:

a) said receiving means includes means for sending, within the same clock cycle received, only one identified long horizontal code to said long code decoding means if such identified long horizontal code is the first code of the series of identified codes and said non-long horizontal code selecting means selects, within the same clock cycle, the decompressed data of the only one identified long horizontal code;

b) said receiving means further includes means for sending, within the same clock cycle received, a series of one or more consecutive identified non-long horizontal codes to said parallel decoding means if one of such identified non-long horizontal codes is the first code in the series of identified codes and said parallel decoding means, within the same clock cycle, generates decompressed data of all non-long horizontal codes in the non-long horizontal code series received thereby from said receiving means and said non-long horizontal code and said selecting means, within the same clock cycle, selects the appropriate decompressed data of the non-long horizontal codes; and c) said receiving means including means for sending either one long horizontal code to said long code decoding means or a non-long horizontal code series of one or more non-long horizontal codes to said parallel decoding means during one clock cycle.

10. The apparatus for decompressing compressed image data in accordance with claim 9 wherein the given number of at least three codes is three codes and the given minimum number of bits is three.

11. The apparatus for decompressing compressed image data in accordance with claim 9 wherein the given number of at least three codes is four codes and the given minimum number of bits is four.

12. The apparatus for decompressing compressed image data in accordance with claim 9 wherein the given number of at least three codes is more than four codes and the given minimum number of bits is equal to the given number of codes.

* * * * *